United States Patent [19]
White

[11] Patent Number: 5,314,153
[45] Date of Patent: May 24, 1994

[54] AWNING WIND PROTECTOR

[76] Inventor: Gary D. White, 117 B Lee Jackson Blvd., Haines City, Fla. 33844

[21] Appl. No.: 897,932

[22] Filed: Jun. 15, 1992

[51] Int. Cl.⁵ .............................. A47B 96/06
[52] U.S. Cl. ..................... 248/229; 160/45; 24/527
[58] Field of Search ............... 248/229, 231.5, 316.5, 248/316.6, 442.2; 24/527; 160/45, 66, 76, 67

[56]  References Cited
U.S. PATENT DOCUMENTS

| | | | |
|---|---|---|---|
| 2,256,409 | 9/1941 | Pucci | 248/231.5 |
| 2,674,186 | 4/1954 | Cameron | 24/527 X |
| 3,601,353 | 8/1971 | Dale | 160/327 X |
| 3,642,150 | 2/1972 | Zizak | 248/229 X |
| 5,039,048 | 8/1991 | Paxton | 248/229 |

FOREIGN PATENT DOCUMENTS 83593  11/1956  Fed. Rep. of Germany ...... 248/229

*Primary Examiner*—Blair M. Johnson

[57] ABSTRACT

An awning wind protector apparatus and method of preventing flapping of the center extended sides of an awning is disclosed, whereby an adjustable clamping arrangement can be firmly, and adjustably enclosed around the outward extending awning support arm of an awning for a recreational vehicle, or other awning use, and having two clamping surfaces extending inwardly from the support arm, and clamping onto the upper, and lower surface of the awning, and located somewhat in the center of the sides of the extended awning, said clamping means preventing the flapping of the center section of the sides of the extended, or, unrolled awning.

2 Claims, 2 Drawing Sheets

AWNING WIND PROTECTOR

BACKGROUND OF INVENTION

This invention relates to an apparatus and method of supporting the sides of an extended awning onto the awning support framework, and preventing the center sides of the awning from flapping in a wind storm. The awning can be attached onto the side of a recreation vehicle, or, onto the side of a dwelling, or other installations.

It has been customary to affix an awning onto the side of a recreational vehicle (RV) to provide shade when the RV is parked. The awning is normally provided on a roller type apparatus, one end of the awning attached onto the side of the RV and the other end of the awning affixed onto the roller apparatus, thusly allowing for the awning to be rolled onto the roller, and the roller affixed into the affixing apparatus on the side of the RV, thereby allowing the RV to be moved from one location to another location, at highway speeds, without damage to the awning. When the RV is parked in a stationary location, the roller is unattached from the side of the RV, unrolled to its extended length, and anchored in this position by means of a supporting framework, said framework being affixed onto the side of the RV also, and provided with an unfolding arrangement, and a telescoping arrangement, providing means for supporting the awning in its extended position, and thusly providing shade, and protection from the elements to the occupants of the RV.

Elaborate telescoping frameworks have been taught in the prior arts for holding the awning in the extended position, and these prior arts have met with some success in protecting the awning. However, as the awning is subjected to the elements, especially damaging winds, during normal camping trips, the side lengths of the awning tends to flap during these winds, creating a dangerous, and sometimes disatrous situation. In some cases, this flapping creates an air foil in the awning surface, thereby creating a lifting force to the awning, which magnifies the problem. Therefore, the awning must be continually monitored by the owner, and rolled onto the roller, during these storms, or, the entire awning, and the supporting framework can be torn from the side of the RV, with the accompanying expense.

Several approaches have been provided for protecting the awning from these winds. Clark, in U.S. Pat. No. 3,789,903, teaches a telescoping, and locking framework, affixed onto the side of the RV, and, when the awning is extended to its useful length, the telescoping arrangement is intended to apply a tension onto the sides of the awning, thereby preventing the awning from flapping in the wind. This art does provide a certain amount of protection to the awning, however, as the awning tends to stretch in random locations during normal use, it is nigh impossible to keep the awning from flapping, using this art. Also, to apply the amount of tension to the awning, required during these wind storms, tends to tear the entire support framework from the sides of the RV, thereby creating more damage to the RV.

Another approach is taught by Turner, in U.S. Pat. No. 4,640,332, whereby a support strap is attached to the roller ends, when the roller is in the extended position, thereby trying to prevent the entire awning assembly from becoming airborne, with the resulting damage to the awning and the RV. These type supports do tend to support the ends of the roller, however, they do not address the flapping of the awning in the wind storms, with the resulting air foil problem, which will tend to shred the awning, bend the roller, and other major damage.

Still another approach is taught in the art of Jones in U.S. Pat. No. 4,801,119, wherein a center bracing framework is attached onto the side of the RV, in the center of the awning framework, and extended outward from the RV to be attached onto the roller assembly, thereby providing support in the outermost center section of the roller, and some tensile strength to the awning itself. This art has the same problem as the other arts studied, in that no support is provided to the sides of the awning, where the problem with the wind begins, which is the forming of air foils in the surface of the awning, which tend to make the surface of the awning act as an airplane wing.

SUMMARY OF THE INVENTION

Accordingly, it is an object of this invention to provide an apparatus and method of preventing the sides of the awning from flapping in a windstorm, said flapping thereby tending to form air foils on the surface of the awning.

Another object of this invention is to provide this apparatus in a very simple, and inexpensive design.

Another object of this invention is to provide this apparatus in a design to be applied to existing awning frameworks of different size materials.

Still another object of this invention is to provide an apparatus, and method of affixing several of the apparatus on each side of the awning, for use in areas of prevailing higher winds.

It should be pointed out that the forming of air foils during higher wind storms is sometimes associated with the overal length of a structure itself, and, the power of these air foils can destroy even a structure as large as a suspension bridge, which happened some time ago. The winds and the awning set up a system of resonance in the frequency of the flapping, thereby magnifying the force of the wind on the structure. This same resonate frequency can be formed on the top of an awning, also. In areas of high winds, as in Iceland, these winds will actually cause an airplane to gain flying speed, while still on the ground, thereby destroying the airplane, if the air foil is not eliminated. In these cases, sand bags are placed along the top of the wing of the aircraft, thereby breaking up the air foil, and eliminating the lifting capability of the wing.

Therefore, it is still another object of this invention to prevent the forming of these air foils on the surface of the awning.

In carrying out this inventon in the illustrative embodiment thereof, a folding, clamping apparatus, having an upper, or top clamping surface, and a bottom clamping surface, and said two clamping surfaces having affixing means around the awning outward extension framework, and said clamping surfaces extending outwardly onto the surface of the awning, one clamping surface on the top of the awning, and the other clamping surface on the bottom of the awning, and the two clamping surfaces being affixed together, thereby forming a firm holding apparatus for the center of the sides of the extended awning, thusly preventing the center of the sides of the awning from flapping in the winds.

Conveniently, the user may open the two clamping surfaces of the invention, position, and close, the two clamping surfaces of the apparatus around the outward extension frameworks of the awning support, one apparatus on each side of the awning outward extension support framework, and positioned somewhat in the center section of the sides of the outwardly extending awning, thereby grasping the awning firmly,

BRIEF DESCRIPTION OF THE DRAWINGS

This invention, together with other objects, features, aspects and advantages thereof, will be more clearly understood from the following description, considered in conjunction with the accompanying drawings.

Two sheets of drawings are furnished, sheet one contains FIG. 1, and sheet 2 contains FIG. 2.

DESCRIPTION OF THE PREFERRED EMBODIMENTS

Figure 1:
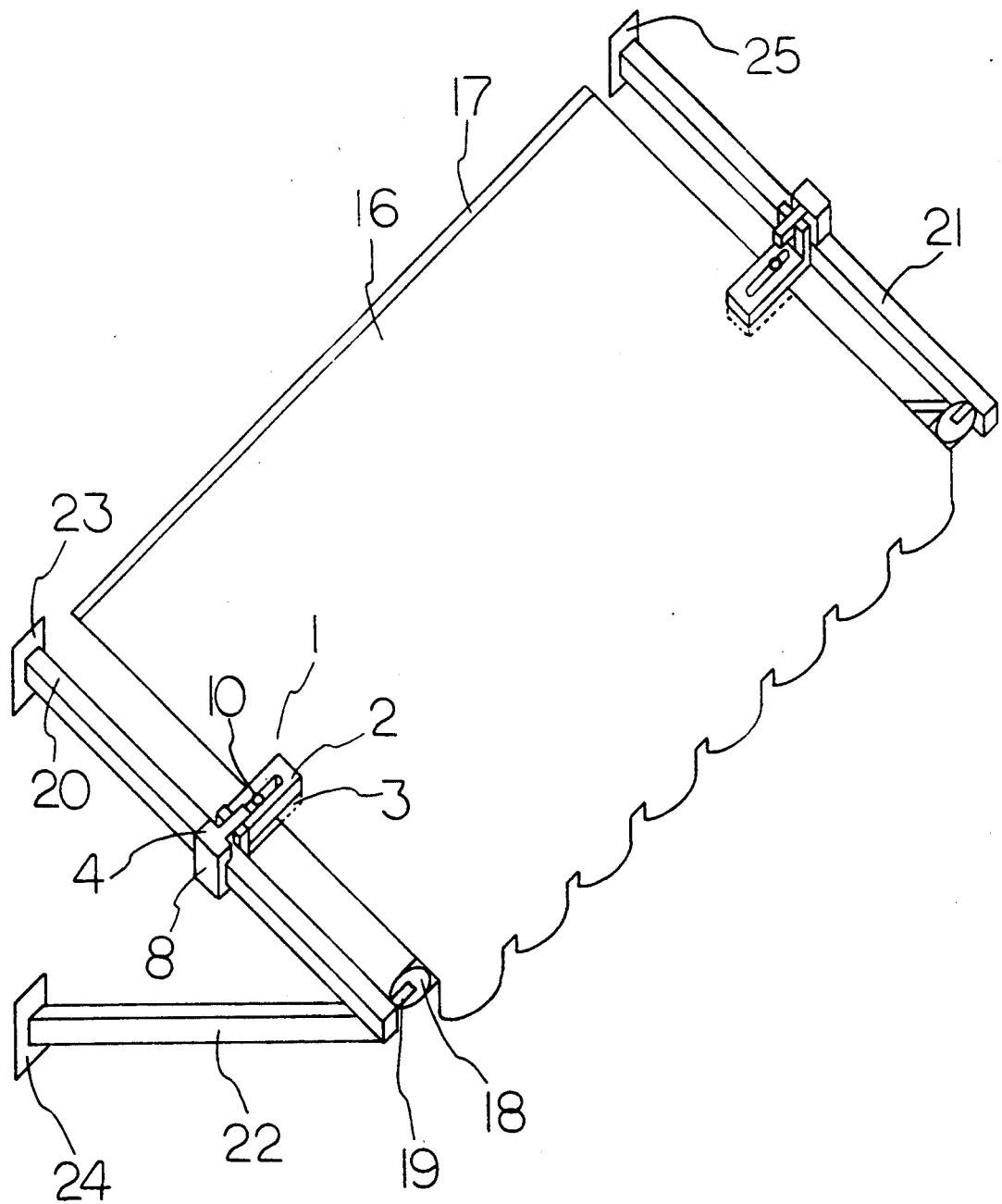
FIG. 1 is an isometric view of a typical awning support system, and the invention installed on the system.

Referring now to FIG. 1, we have an awning 16 being extended from the side of a recreational vehicle (RV), and being supported therefrom by an awning support system, said system comprising affixing means 17, on the side of said RV (not shown) and a roller 18, said roller 18 being rotatably attached to two extension arms 20, and 21, by pins 19. Extension arm 22 providing estension means for awning 16 in its unrolled position. Also, extension arm 20, and 21, are normally of the telescoping type, said telescoping providing tension to awning 16, said tension tending to prevent flapping of awning 16 in higher wind conditions. The entire awning support system being affixed onto side of RV by anchor brackets 23, 24, and 25.

Still referring to FIG. 1, awning wind protector 1 being affixed around extension arms 20, and 21 by removing holding screw 10, unfolding top clamp 2 and bottom clamp 3, using top section 4, surrounding extension arm 20, and 21, and replacing screw 10, making sure that top clamp 2, and bottom clamp 3, form a clamping means onto center sides of awning 16. The top portion 4 of top clamp 2 prevents the entire awning wind protector 1 from being forcibly removed from extension arms 20, and 21, by higher winds.

Figure 2:
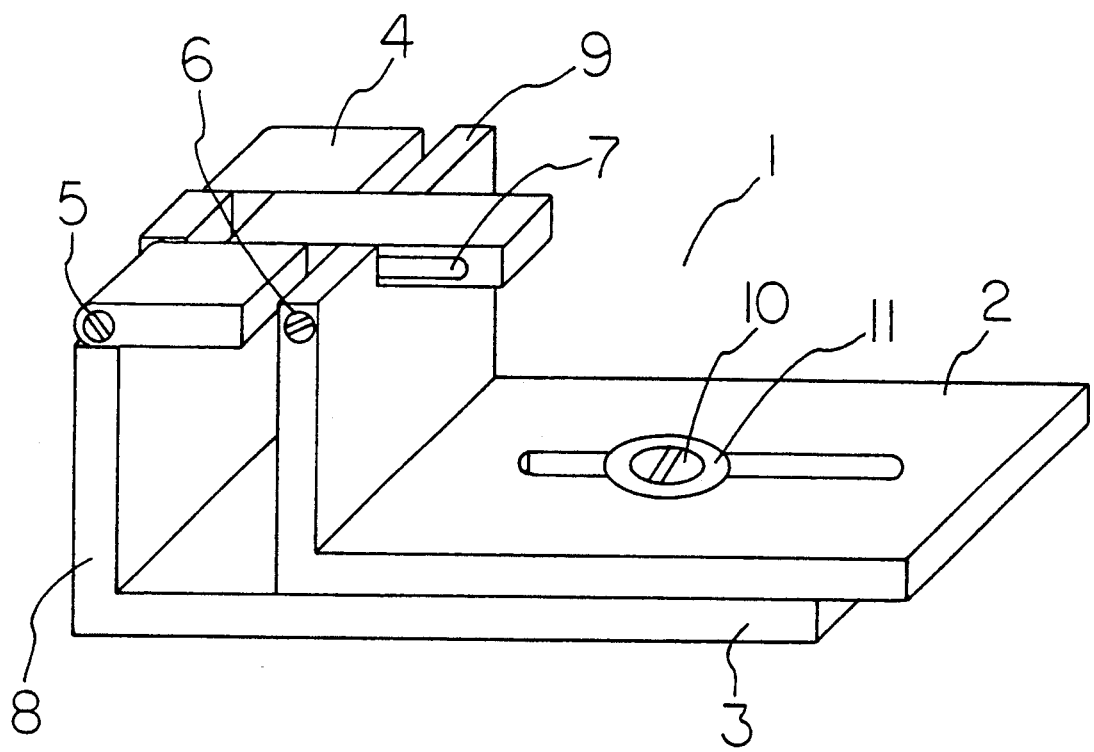
FIG. 2 is an isometric view of the invention, showing the clamping ability of the apparatus.

Now referring specifically to FIG. 2, we see an awning wind protector 1 in its folded, or clamping position. Said awning wind protector 1 comprises two main clamping jaws, a top clamping jaw 2, and a bottom clamping jaw 3, said clamping jaws 2, and 3 forming a holding method for an awning 16, said awning 16 being affixed onto a recreational vehicle (RV), not shown. Referring back to FIG. 1, at least two awning wind protectors 1 are installed on said awning 16, one awning wind protector 1 on each side of said awning 16, located centerwise along the extended sides of awning 16.

Referring again to FIG. 2, an enclosure being formed by bottom clamp 3, and its rear section 8, top section 4, and front section 9 of top clamp 2. Said enclosure being adjustably formed by hinge screw 5, hinge screw 6, hinge screw 6 having adjusting means of slot 7, thereby providing adjustable means for fitting around extension arms 20, and 21 of FIG. 1, of varying sizes. The two clamping jaws 2, 3, are held in the clamping position by holding screw 10, and washer 11, and slot 12 providing adjusting means for more secure clamping of awning wind protector 1 onto awning 16, of FIG. 1.

Accordingly, a very unique, attractive, convenient method and apparatus are provided for preventing an awning from flapping, while in the extended, unrolled position.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. An awning wind protector apparatus for preventing an outwardly extending center of an awning from flapping in the wind and to protect it from other elements, comprising:

a substantially L-shaped top clamping jaw having a width and a thickness, a vertical portion having a height, and an extended horizontal portion of approximately four times the length of said vertical portion of said top clamping jaw, a substantially L-shaped bottom clamping jaw, having a width and a thickness substantially the same as that of said top clamping jaw, a vertical portion of a height of approximately one thickness more than said height of said top clamping jaw vertical portion, and an extended horizontal portion of approximately five time the height of said vertical portion of said bottom clamping jaw, a flat top portion having a first and second ends and having a width and thickness to match said width and thickness of said top clamping jaw and said bottom clamping jaw, said flat top portion being adjustably and hingedly affixed at said first end to a free end of said vertical portion of said top clamping jaw and also hingedly affixed at said second end to a free end of said vertical portion of said bottom clamping jaw, said first end having an elongated slot which permits said adjustability between said first end and said fee end of said vertical portion of said top clamping jaw, said extended horizontal portion of said top clamping jaw and said extended horizontal portion of said bottom clamping jaw being engaged said apparatus forming a substantially square opening at one end for clamping a substantially square piece of material, and said apparatus also defining means for clamping a piece of awning material between said top clamping jaw an said bottom clamping jaw, said clamping means being between said extended horizontal portion of said top clamping jaw and said extended horizontal portion of said bottom clamping jaw.

2. The awning wind protector apparatus of claim 1 wherein said clamping means between said extended horizontal portion of said top clamping jaw and said extended horizontal portion of said bottom clamping jaw is adjustable, said clamping means comprising substantially narrow elongate slots formed along a center axis of said extended horizontal portions of said tow clamping jaws, and suitable with fastening means extending through said slots.

* * * * *